United States Patent [19]

Lindsay et al.

[11] Patent Number: 5,203,908
[45] Date of Patent: Apr. 20, 1993

[54] PROCESS FOR RECOVERY OF FREE ALUMINUM FROM ALUMINUM DROSS OR ALUMINUM SCRAP USING PLASMA ENERGY AT HIGH ENTHALPY

[75] Inventors: Richard D. Lindsay; Terry L. Moore, both of Brentwood, Tenn.

[73] Assignee: Plasma Processing Corporation, Millwood, W. Va.

[21] Appl. No.: 844,443

[22] Filed: Mar. 2, 1992

[51] Int. Cl.$^5$ ............................................. C22B 21/00
[52] U.S. Cl. .................................... 75/10.35; 75/10.19
[58] Field of Search ............................. 75/10.35, 10.19

[56] References Cited
U.S. PATENT DOCUMENTS
4,877,448 10/1989 Lindsay .............................. 75/10.35

Primary Examiner—Peter D. Rosenberg
Attorney, Agent, or Firm—Breiner & Breiner

[57] ABSTRACT

A process for recovering free aluminum and aluminum compounds such as aluminum oxide from aluminum dross and aluminum scrap in a furnace heated with a plasma arc torch wherein air at high enthalpy is used as the arc gas. The use of air at high enthalpy as the arc gas provides for more rapid heat output, causing the outer surface or shell of dross to heat rapidly, thereby rupturing the oxide shell releasing free aluminum from within the shell. A higher aluminum recovery is obtained. In a plasma torch high enthalpy is obtained by adding a gas such as $CO_2$, methane or hydrogen to the air arc gas at a fixed current level or by operating the plasma torch with higher current at a fixed air flow.

12 Claims, 3 Drawing Sheets

PROCESS FOR RECOVERY OF FREE ALUMINUM FROM ALUMINUM DROSS OR ALUMINUM SCRAP USING PLASMA ENERGY AT HIGH ENTHALPY

RELATED PATENTS

This application is related to Lindsay, U.S. Pat. No. 4,877,448 based on application Ser. No. 281,049 filed Dec. 8, 1988.

FIELD OF INVENTION

This invention relates to the recovery of aluminum from aluminum dross or aluminum scrap, such as aluminum cans, using a plasma arc torch. More particularly, the invention relates to a process for the recovery of aluminum metal from aluminum dross and aluminum scrap in a furnace heated with a plasma arc torch operated on air, or other oxidizing arc gas, at high enthalpy. Surprisingly, air or other oxidizing gases at high enthalpy provide a higher recovery of aluminum from the dross.

BACKGROUND OF INVENTION

When a body of aluminum is melted in a furnace for purposes of casting or the like, dross forms on the surface of the molten aluminum and must be periodically removed, for example by skimming or similar operation. The removed dross generally contains economically substantial amounts of free aluminum as well as aluminum oxides and certain other metals and metal salts, such as magnesium, manganese, and lithium depending on the nature of the aluminum or aluminum alloy being treated.

U.S Pat. No. 4,877,448 discloses a process for the recovery of free aluminum and aluminum oxides from aluminum dross and aluminum scrap (hereinafter, for convenience, collectively referred to as "dross" or "aluminum dross") comprising heating the dross in a high temperature furnace using a plasma arc torch fed with air, or other oxidizing gas such as a mixture of air and oxygen or air and nitrogen as the arc gas. The use of air as the arc gas, in comparison to nitrogen (1) provides 40% more heat output with the same electrical input (KW/hr), resulting in a shorter processing time and substantially higher throughputs;

(2) provides reduced nitride formation since the hottest part of plasma which is closest to the torch is oxidizing, not nitriding;

(3) provides an oxide, $Al_2O_3$, which is stable and not an environmental problem in contrast to a nitride which is produced with nitrogen which is unstable and is an environmental problem; and (4) is more economical since air is much cheaper than nitrogen or argon, or any other available inert arc gas.

The ability to use air as the arc gas and the enhanced results obtained was surprising. It was to be expected that the preferred gas would be nitrogen or other non-oxidizing gas such as argon, neon, and the like so as to avoid oxidation and burning of the aluminum as would be expected to occur in the presence of air. However, it was found that when using nitrogen as the arc gas nitriding occurred, causing difficulty in the operation of the torch and in substantial loss of aluminum; whereas air not only did not burn to any substantial degree, but provided highly beneficial results.

Excessive oxidation of the aluminum does not occur when air is used as the arc gas because of the very limited amount of air admitted through the plasma torch; and, accordingly, the aluminum burning is controlled. The loss of aluminum is lower than that lost due to nitriding with nitrogen as the arc gas, and additionally increased heat output with the same electrical KW/hr input is obtained. This, in turn, results in the shorter processing time and substantially higher, approximately twice, dross throughput.

Plasma torches, including torches used in processing dross using air as the arc gas, have been conventionally operated at about 3,500–4,000 BTU/#arc gas. Higher enthalpy has been avoided in that higher enthalpy has been believed to lead to higher electrode consumption. Moreover, at higher enthalpy heat loss within the torch is greater, thus leading to inefficiency.

SUMMARY OF INVENTION

It has been found according to the present invention that substantially greater recovery of free aluminum from the dross is possible when the enthalpy of the arc gas used in operating the plasma torch is increased to above about 4,200 BTU/#arc gas. Enthalpy as used herein is defined as energy/#arc gas. The increased enthalpy provides more rapid heating of the outer surface of the dross, which is largely an aluminum oxide shell. The rapid heating ruptures the outer surface or oxide shell without substantial heating of the aluminum contained within the oxide shell. Thus, with the rupture of the shell, free metal within the dross is released into the melt for recovery. It is desirable that the furnace not get too hot since this will cause deterioration of the free metal either by burning, by oxide formation (if oxygen is present), or by formation of aluminum nitrides. The rapid heating of the dross as provided with the high enthalpy arc gas causes all of the heat to be absorbed initially by the oxide shell while the interior of the dross where the free metal is found remains relatively cool. As a result, the free metal when it is released will flow to the center of the furnace at a relatively low temperature for recovery in high yields.

The high enthalpy of the arc gas is preferably obtained by increasing the operating current of the torch or by adding a small amount of a gas such as carbon dioxide, methane or hydrogen to the arc gas through the vortex of the plasma torch or through the rear of the torch and through the electrodes of the torch. A reactive gas such as a halogen gas, i.e., sulfur hexafluoride, can be utilized as the added gas. Alternatively, the high enthalpy can be obtained by increasing the operating pressure of the torch, for example by restricting the plasma flow with a nozzle or the like. The enthalpy for an operating torch will be in the range of at least about 4,200 BTU/#arc gas and preferably above about 4,800 BTU/#arc gas. Most preferably, the enthalpy range will be above about 6,000 BTU/#arc gas to about 10,000 BTU/#arc gas. Accordingly, while improved yields are obtained when the enthalpy of the gas is maintained above about 4,200 BTU/#arc gas, preferably the enthalpy is maintained above about 4,800 BTU/#arc gas and most preferably in the range of from about 6,000 BTU/#arc gas to 10,000 BTU/#arc gas. It has been found that in this range the electrode life is adequate, and further the internal heat loss through the torch is acceptable.

The increased enthalpy can be obtained by increasing the operating current of the torch or by adding a gas selected from the group carbon dioxide, methane and hydrogen in an amount of from about 1 to 12% of the total arc gas used, at a fixed current. It is also possible to increase the enthalpy of the arc gas by operating the plasma torch at increased pressures.

THE DRAWING AND DETAILED DESCRIPTION

A presently preferred embodiment will be described in reference to the drawing wherein FIG. 1 is a flow diagram of the process of the present invention;

Figure 1:
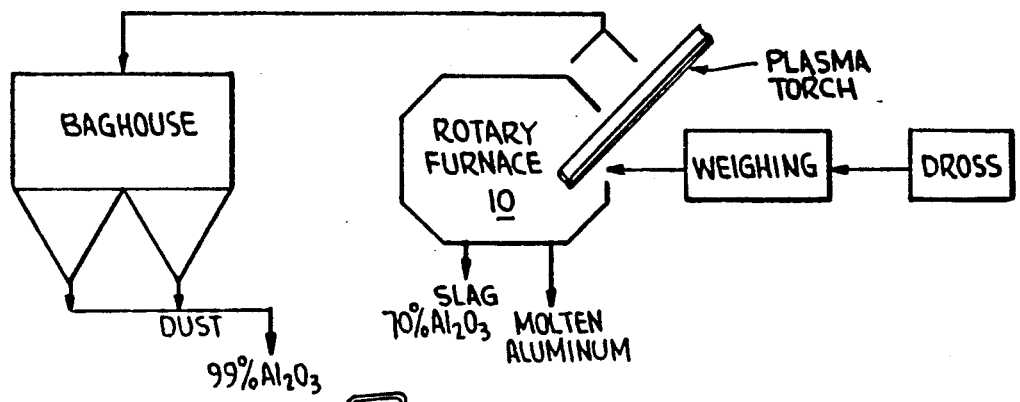

Referring to FIG. 1, in the process of the present invention dross is weighed and charged into a furnace 10. After charging the dross to the furnace, a plasma arc torch 30 is brought into position in the furnace and the dross heated to the molten state. The molten free aluminum is recovered. The dust which is about 99% aluminum oxide from the furnace is passed to a bag house for recovery. The slag which forms on the furnace walls is scraped from the furnace and is preferably recharged to the furnace with additional dross.

Figure 2:
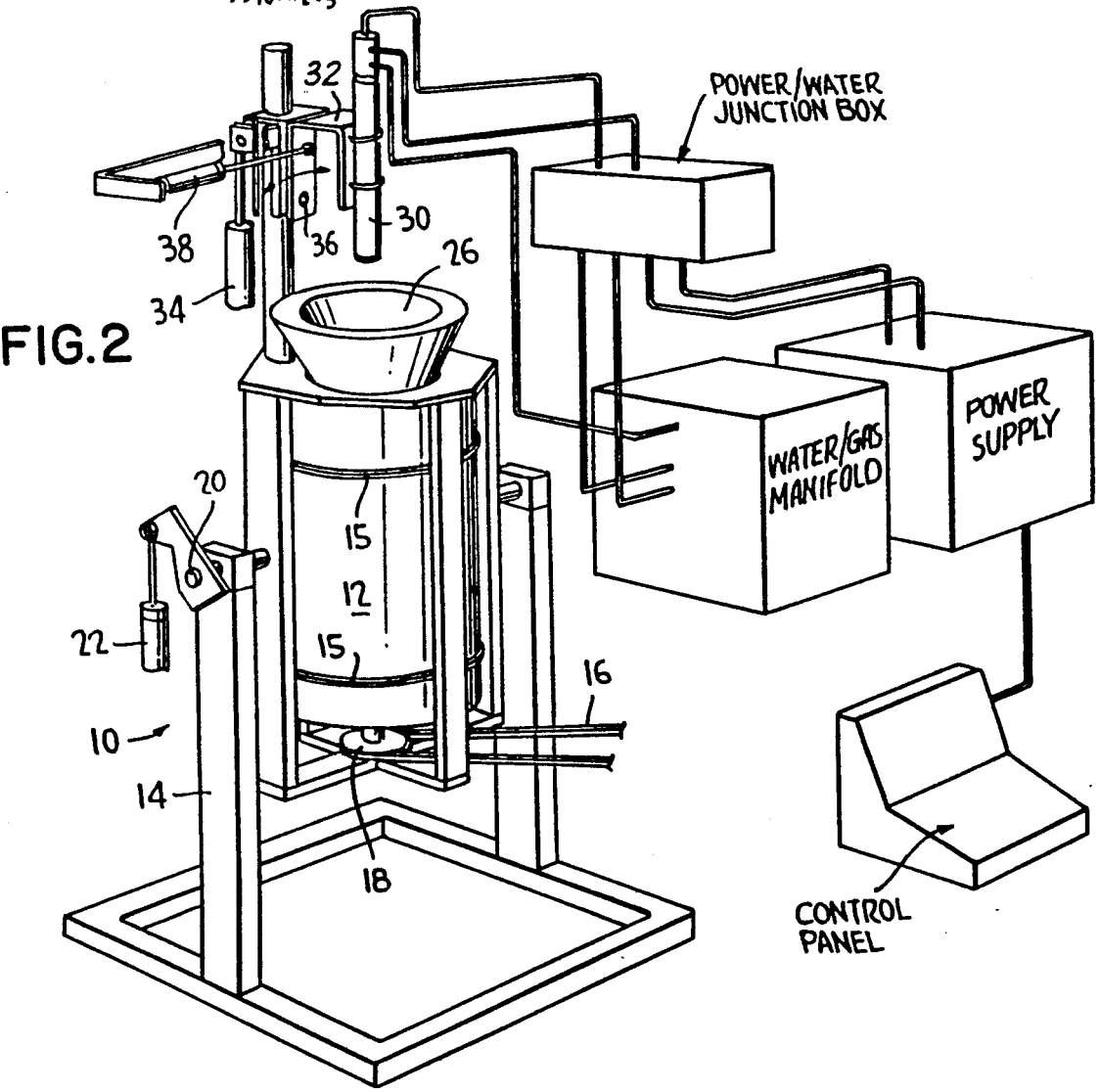
FIG. 2 is a schematic drawing of the furnace, plasma arc torch, and supply system used in the process of this invention.
Figure 3:
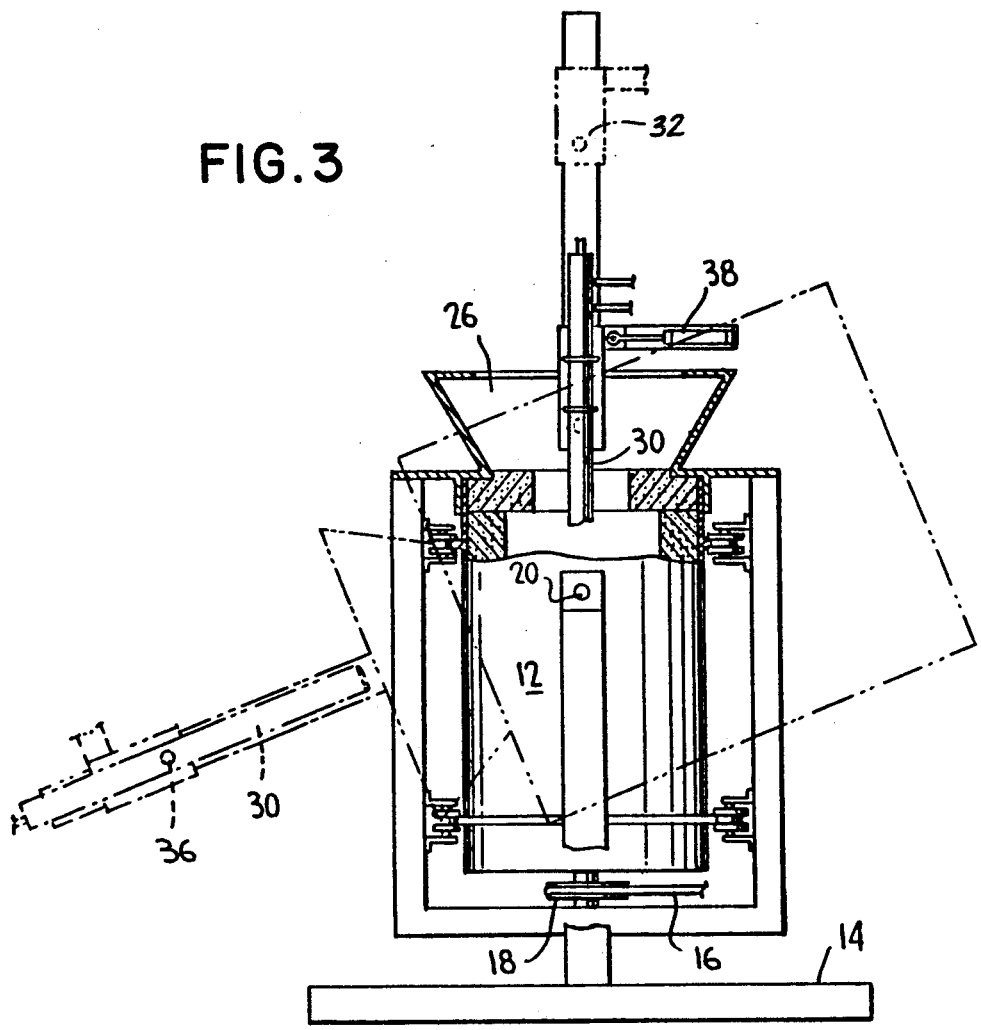
FIG. 3 is a side elevational view of the furnace and plasma torch shown in FIG. 2.

While any furnace configuration can be utilized with either a transferred arc or a non-transferred arc plasma torch, the preferred furnace, as shown in FIGS. 2 and 3, is a tilting, rotating furnace with a non-transferred arc plasma torch. Thus the furnace comprises a rotating drum 12 on frame 14 which is driven on rails 15 by belt 16 and pulley 18 with an electric motor (not shown). As is also shown in FIGS. 2 and 3, the drum, carrying torch 30, tilts about pivot point 20 actuated by an air cylinder 22 to permit convenient recovery of the aluminum. Accordingly, the supply lines to the plasma torch must be flexible.

Plasma torch 30 is removably positioned in cover 26 of furnace 10. The torch on frame 32 is moved vertically into and out of position by an air cylinder 34. Once in position in the furnace, the torch can be swung back and forth within the furnace in order to cover the entire furnace area around pivot point 36 by activation of air cylinder 38. The torch is positioned independent of drum 12 to permit rotation of the drum.

Figure 4:
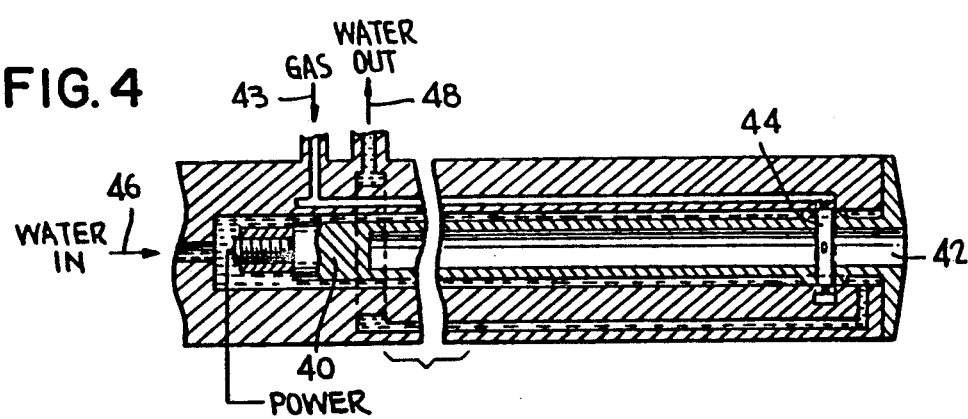
FIG. 4 is a schematic cross section of the plasma arc torch used in the present invention.

Plasma torches which are operable in the process of the invention are of the transfer and non-transfer type commercially available from Plasma Energy Corporation, Raleigh, N.C., or other vendors. Suitable torches are also described in Camacho, U.S. Pat. No. 4,383,820; and Camacho et al, U.S. Pat. No. 4,559,439. A simplified cross section of a suitable transfer arc torch is shown in FIG. 4 of the drawing. As illustrated, the torch designed for operating in the transferred arc mode includes an electrode 40, a collimator 42, a vortex generator 44, water input means 46 for cooling the torch mechanism, and a water output means 48. Gas input means 43 feeds gas to the vortex generator 44 between electrode 40 and collimator 42. In the plasma generator system the furnace base and the dross being heated function as the ground for receiving the transferred arc from electrode 40. As shown in FIG. 2, the water/gas manifold and the electrical power supply for the torch are supplied to a power/water junction box and then fed to the torch. The air arc gas is ionized between the vortex generator and the collimator.

The invention will be more specifically defined by the following examples:

EXAMPLE 1

2.5 tons (5,000) pounds of aluminum alloy dross containing approximately 60% aluminum was charged into rotating furnace 10. A PT250N non-transferred arc plasma torch 30 producing a plasma gas enthalpy of 6,444 BTU/#arc gas and manufactured by the Plasma Energy Corporation was lowered into position and directed by air cylinder 38 to contact substantially the center of the bottom of furnace drum 12. Electrical power, coolant water, and air arc gas supplemented by 9% $CO_2$ were supplied to torch 30. With rotation of the furnace drum 12, the charge was heated to the molten condition, and thereafter the heating was continued for a period of 20 minutes. The torch was then withdrawn and the molten aluminum discharged by tilting the furnace drum. The 5,000 pound charge produced 2,880 pounds of pure alloy aluminum. The slag was scraped from the bottom of the drum to provide 2,170 pounds aluminum oxide. Additionally, 50 pounds aluminum oxide was recovered from the bag house. The increase in total weight is due to the oxygen present in the form of oxides.

EXAMPLE 2

The process of Example 1 was repeated. However, in this instance the arc gas was air at a plasma gas enthalpy of 4,900 BTU/#arc gas. For the same one hour heating period, the recovery was as follows: 2,670 pounds pure alloy aluminum; 2,350 pounds slag, and 50 pounds of dust. There is an added advantage of 7.0% more recovery of the available aluminum in the first example.

Figure 5:
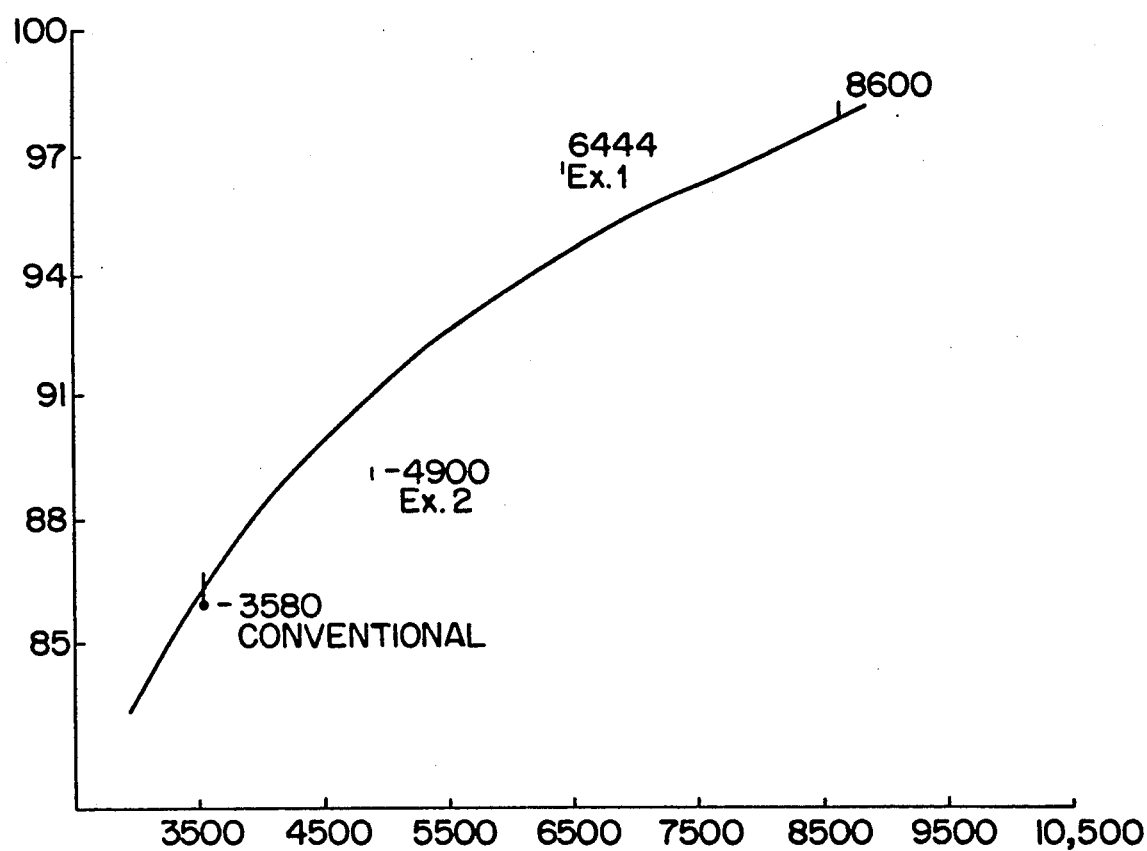
FIG. 5 is an enthalpy profile using air as the arc gas with and without addition of $CO_2$ to the arc gas.

The advantages of using high enthalpy air as the arc gas is further shown by the enthalpy profile set forth in FIG. 5. Referring to FIG. 5, the normal enthalpy operating range in conventional torches is below about 4,000 BTU/#arc gas which provides a percent recovery of free aluminum of about 86-87%. As shown in Example 2, an enthalpy of 4,900 BTU/#arc gas provides a percent recovery of 89%. An enthalpy of 6,444 BTU/#arc gas provides a percent recovery of 96.5%. An enthalpy of 8,600 BTU/#arc gas provides a recovery of 98%. As established, therefore, a small enthalpy change gives a disproportionate increase in yield. In this profile, the percentages given assume that all operating conditions are otherwise the same.

In the aforesaid examples, the aluminum recovery was from aluminum dross. However, equivalent improvement is obtained with aluminum scrap. Additionally, although air is the preferred oxidizing arc gas because of its economy, it is possible to use other gases as additive to air to increase the overall plasma gas enthalpy. Gases which are effective in adding enthalpy to the gas charge include $CO_2$, $CH_4$, and $H_2$.

As will be apparent to one skilled in the art, various modifications can be made within the scope of the aforesaid description. Such modifications being within the ability of one skilled in the art form a part of the present invention and are embraced by the appended claims.

It is claimed:

1. A process of recovering free aluminum from aluminum dross or aluminum scrap comprising charging aluminum dross or aluminum scrap to a furnace equipped with a plasma arc torch for heating said charge; heating said charge by providing plasma energy to said charge generated by air plasma at an enthalpy of at least about 4,200 BTU/#arc gas; continuing said heating until said molten, and removing free aluminum in the molten state from said furnace.

2. The process of claim 1 wherein said air is mixed with $CO_2$ to increase the enthalpy.

3. The process of claim 1 wherein said air is mixed with methane to increase the enthalpy.

4. The process of claim 1 wherein said air is mixed with hydrogen to increase the enthalpy.

5. The process of any one of claims 1-4 wherein said enthalpy is above about 4,800 BTU/#arc gas.

6. The process of any one of claims 1-4 wherein said enthalpy is in the range of about 6,000-10,000 BTU/#arc gas.

7. Method of treating dross with plasma comprising supplying dross comprising free metal surrounded (a) supplying dross comprising free metal surrounded by a metal oxide shell to a furnace at a temperature below about 300° C.;

(b) providing plasma energy to said furnace containing said dross to heat said dross, said plasma energy having an enthalpy of at least about 4,200 BTU/#arc gas, whereby said metal oxide shell of said dross reaches a temperature sufficient to rupture said shell before the metal within said shell is heated above a temperature of about 950° C. to thereby release molten metal from within said shell; and (c) recovering said free metal from the furnace.

8. The method of claim 7 wherein said air is mixed with $CO_2$ to increase the enthalpy.

9. The method of claim 7 wherein said air is mixed with methane to increase the enthalpy.

10. The method of claim 7 wherein said air is mixed with hydrogen to increase the enthalpy.

11. The method of any one of claims 7-10 said enthalpy is above about 4,800 BTU/#arc gas.

12. The method of any one of claims 7-10 wherein said enthalpy is in the range of about 6,000-10,000 BTU/#arc gas.

* * * * *

UNITED STATES PATENT AND TRADEMARK OFFICE
CERTIFICATE OF CORRECTION

PATENT NO. : 5,203,908

DATED : April 20, 1993

INVENTOR(S) : Richard D. Lindsay et al

It is certified that error appears in the above-indentified patent and that said Letters Patent is hereby corrected as shown below:

Column 5, line 7, "heating until said molten," should read -- heating until said charge is molten, --;

Column 5, line 25, "supplying dross comprising free metal surrounded" should be omitted.

Signed and Sealed this

Twenty-sixth Day of July, 1994

Attest:

BRUCE LEHMAN

Attesting Officer     Commissioner of Patents and Trademarks